United States Patent

Ishihara et al.

[11] Patent Number: 5,916,284
[45] Date of Patent: *Jun. 29, 1999

[54] SYSTEM FOR DISPLAYING TRACK OF A MOVING BODY

[75] Inventors: Shinji Ishihara, Takarazuka; Takehiko Nishimura, Ikoma, both of Japan

[73] Assignee: Furuno Electric Co., Ltd., Hyogo-ken, Japan

[*] Notice: This patent is subject to a terminal disclaimer.

[21] Appl. No.: 08/994,780

[22] Filed: Dec. 19, 1997

Related U.S. Application Data

[62] Division of application No. 08/443,385, May 17, 1995, Pat. No. 5,754,429, which is a continuation of application No. 08/066,159, filed as application No. PCT/JP92/01294, Oct. 5, 1992, abandoned.

[30] Foreign Application Priority Data

Oct. 4, 1991 [JP] Japan .................................. 3-257512
Jul. 29, 1992 [JP] Japan .................................. 4-202215

[51] Int. Cl.⁶ .............................. G01C 21/10; C01S 7/22
[52] U.S. Cl. ........................... 701/21; 701/300; 701/207; 340/995
[58] Field of Search ............................. 701/21, 205, 207, 701/223, 1, 213, 300; 340/995; 342/41; 73/178 R, 181

[56] References Cited

U.S. PATENT DOCUMENTS

| | | | |
|---|---|---|---|
| Re. 25,756 | 4/1965 | Balding ................................. | 340/971 |
| Re. 32,357 | 2/1987 | Nagao et al. ......................... | 364/449 |
| 3,725,918 | 4/1973 | Fleischer et al. ..................... | 342/41 |
| 3,754,247 | 8/1973 | Hansford .............................. | 73/178 |
| 3,971,018 | 7/1976 | Isbister et al. ........................ | 342/41 |
| 4,340,936 | 7/1982 | Mounse ................................ | 364/443 |
| 4,405,986 | 9/1983 | Gray ..................................... | 364/453 |
| 4,633,709 | 1/1987 | Numata et al. ....................... | 364/443 |
| 4,713,767 | 12/1987 | Sato et al. ........................... | 364/453 |
| 4,747,359 | 5/1988 | Ueno .................................... | 318/588 |
| 4,999,783 | 3/1991 | Tenmoku et al. .................... | 364/447 |
| 5,032,842 | 7/1991 | Tanigaki et al. ..................... | 342/182 |
| 5,065,161 | 11/1991 | Shibutani ............................. | 342/182 |
| 5,089,816 | 2/1992 | Holmes, Jr. ......................... | 340/971 |
| 5,209,682 | 5/1993 | Duning et al. ....................... | 318/588 |
| 5,214,414 | 5/1993 | Levine et al. ........................ | 345/157 |
| 5,227,786 | 7/1993 | Hancock .............................. | 364/439 |
| 5,247,466 | 9/1993 | Shimada et al. ..................... | 364/453 |

FOREIGN PATENT DOCUMENTS

| | | |
|---|---|---|
| 55-146006 | 11/1980 | Japan . |
| 56-31602 | 3/1981 | Japan . |
| 57-73617 | 5/1982 | Japan . |
| 60-164278 | 8/1985 | Japan . |
| 61-22275 | 1/1986 | Japan . |
| 62-214315 | 9/1987 | Japan . |
| 2025722 | 7/1978 | United Kingdom . |

*Primary Examiner*—Michael Zanelli
*Attorney, Agent, or Firm*—Birch, Stewart, Kolasch & Birch

[57] ABSTRACT

The present invention relates to a display system for displaying a past track of the ship, the present position of the ship, and a future predicted track of the ship. A display system according to the present invention generates coordinate data representing a desired pattern based on the ship's speed and the ship's bearing in order to display a past track of the ship and a future predicted track of the ship.

16 Claims, 10 Drawing Sheets

SYSTEM FOR DISPLAYING TRACK OF A MOVING BODY

This application is a divisional of application Ser. No. 08/443,385, filed on May 17, 1995, now U.S. Pat. No. 5,754,429; which is a continuation of application Ser. No. 08/066,159, filed on Jun. 4, 1993, now abandoned. Application Ser. No. 08/443,385 is the national phase of PCT International Application No. PCT/JP92/01294 filed on Oct. 5, 1992 under 35 U.S.C. § 371. The entire contents of each of the above identified applications are hereby incorporated by reference.

TECHNICAL FIELD

The present invention relates to a display system for displaying a past track of a moving body and a future predicted track thereof. The invention also relates to a display system for displaying the shape of a moving body as superimposed on the earth surface at the same scale.

Hereinafter, the present invention will be explained as embodied in a ship's maneuvering assistance system used in berthing operations.

PRIOR ART

For large-sized vessels such as tankers, there is required very careful and high-level maneuvering technique in terms of safety when the ship approaches or leaves a pier. As support systems used for this purpose, there have been available Doppler sonars and berthing speedometers, which measure the ship speed with high accuracy. These instruments are, in general, capable of providing information not only on parallel movements of a ship in a fore-aft direction of or in an athwartship direction of the hull but also on its turning movements, by measuring the ship's speed at the bow in a fore-aft direction and the ship's speed at the stern of the ship in an athwartship direction.

Figure 10:
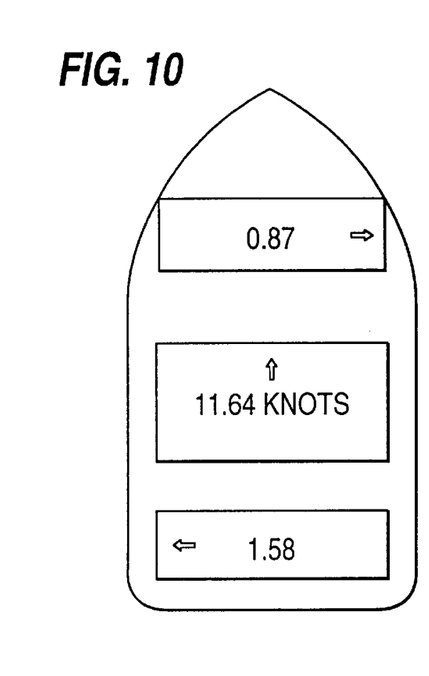
FIG. 10 is a display example presented by a prior art navigation assistance system.

However, these instruments only display a present advancing speed of the ship and a present advancing direction thereof, and present speeds of the ship at the bow and stern thereof respectively, in the left and right directions in numerical values, as shown in FIG. 10. There were no displays with regard to the past movements of the hull of the ship and the like. To conceive a moving manner of the ship, it has been necessary to observe variation of a numerical value representing the speed of the ship for a while. Accordingly, a necessary navigational instruction could not be presented promptly. It has also been difficult to conceive precisely, the moving manners or the movements of the ship merely from variations in the numerical values.

DISCLOSURE OF THE INVENTION

An object of the present invention is to provide a display system which is capable of displaying a past track and a future predicted track of a moving body.

Another object of the invention is to provide a display system which is capable of displaying a past track and future predicted track of the ship.

Still another object of the invention is to provide a display system for displaying the present position of the ship, a past track of the ship and a future predicted track of the ship with shapes of the hull of the ship.

A further object of the invention is to provide a display system for displaying the shape of an moving body as superimposed on the earth surface at the same scale.

A still further object of the invention is to provide a display system for displaying the shape of a ship's hull as superimposed on the earth surface at the same scale.

Still another object of the invention is to provide a display system for displaying the shapes of a ship's hull as superimposed on the earth surface at the same scale, with groups of the shapes respectively representing the present position of the own ship, a past navigation trace of the ship and a future predicted trace of the ship.

Still another object of the invention is to provide a display system for displaying the shape of the ship, other objects existing in surrounding areas around the ship and the earth surface at the same scale.

Still another object of the invention is to provide a ship maneuvering assistance system which is capable of displaying the form of the ship, a pier and the earth surface at the same scale so that relative relations among them can be easily grasped.

Still another object of the invention is to provide a display system for displaying groups of shapes of a hull respectively representing the present position of the ship, a past navigation track of the ship and a future predicted track of the ship with respect to piers as superimposed on the earth surface at the same scale.

Still another object of the invention is to provide a display system for displaying the shape of the ship and radar images on the display surface of an indicator at the same scale.

Still another object of the invention is to provide a display system for displaying groups of shapes of the ship representing respectively the present position of the ship, a past navigation track of the ship, and a future predicted track of the ship and radar images as superimposed one on another at the same scale.

Still another object of the invention is to provide a ship maneuvering assistance system for displaying piers, groups of shapes of a ship's hull respectively representing the present position of the ship, a past navigation track of the own ship and a future predicted track of the ship, and radar images as superimposed one on another at the same scale.

A first feature of the present invention is to provide a display system which comprises speed detection means for detecting the speed of a ship, bearing detection means for detecting a bearing of the ship with respect to a reference bearing, rate of turn measuring means for detecting the turning speed of the ship's hull, storing means for successively storing ship's speeds output from the speed detection means and ship's bearings output from the bearing detection means, coordinate-data generating means for generating coordinate data representing a desired pattern based on the ship's speeds and the ship's bearings read out from the storing means, and the turning speed of the ship's hull output from the rate of turn measuring means in order to display a past track of the ship and a futrue predicted track of the ship with the pattern, coordinate-data storing means for storing the coordinate data, and an indicator for displaying the signals read from the coordinate-data storing means.

It is also to display a past track of the ship or a future predicted track of the ship or a past track and a future predicted track of the ship with a pattern of shapes of the ship.

A second feature of the present invention is to provide a ship maneuvering assistance system which comprises speed detection means for detecting the speed of a ship, bearing detection means for detecting a bearing of the ship with respect to a reference bearing, rate of turn measuring means for detecting rate of turn of the ship, storing means for successively storing speeds of the ship output from the speed detection means and the ship's bearings output from the bearing detection means, ship's hull point storing means for storing signals representing a plurality of points of the ship's hull, coordinate-data generating means for generating coordinate data representing a pattern of shapes of the ship based on the ship's speeds and ship's bearings read out from the storing means, the signals representing the plurality of points of the ship's hull read out from the ship's hull point storing means and the rate of turn of the ship output from said rate of turn measuring means in order to display a past track of the ship or a future predicted track of the ship or a past and future predicted track of the ship with the pattern, land form storing means for storing signals representing land forms such as lands or islands, coordinate-data storing means for storing the coordinate data and the signals representing land forms read out from the land form storing means, and an indicator for displaying the signals read from the coordinate-data storing means.

A third feature of the present invention is to provide a display system which comprises speed detection means for detecting the speed of a ship, bearing detection means for detecting a bearing of the ship with respect to a reference bearing, rate of turn measuring means for detecting the turning speed of the ship, storing means for successively storing the ship's speeds output from the speed detection means and the ship's bearings output from the bearing detection means, coordinate-data generating means for generating coordinate data representing a desired pattern based on the ship's speeds and the ship's bearings output from the storing means and the turning speed of the ship output from the rate of turn measuring means in order to display a past track of the ship and a future predicted track of the ship or a past and future predicted track of the ship with the pattern, coordinate-data storing means for storing the coordinate data, radar signal supply means for supplying radar image signals, and an indicator for displaying the signals read from the coordinate-data storing means and the radar image signals supplied from the radar signal supply means.

The basic principle of the present invention is as follows.

Figure 2:
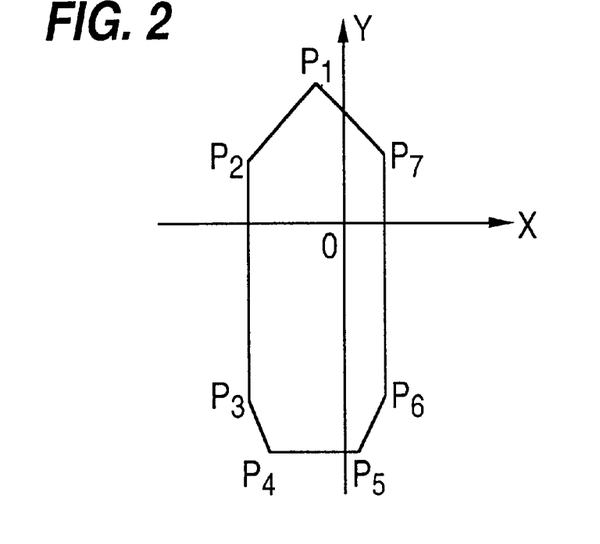
FIG. 2 is a view showing coordinates of points of the hull of the ship.

It is assumed that the coordinates of respective points of the ship's hull P1 through P7 have been previously set with with respect to the origin at which a ship's speed measuring device is installed, as shown in FIG. 2.

Figure 3:
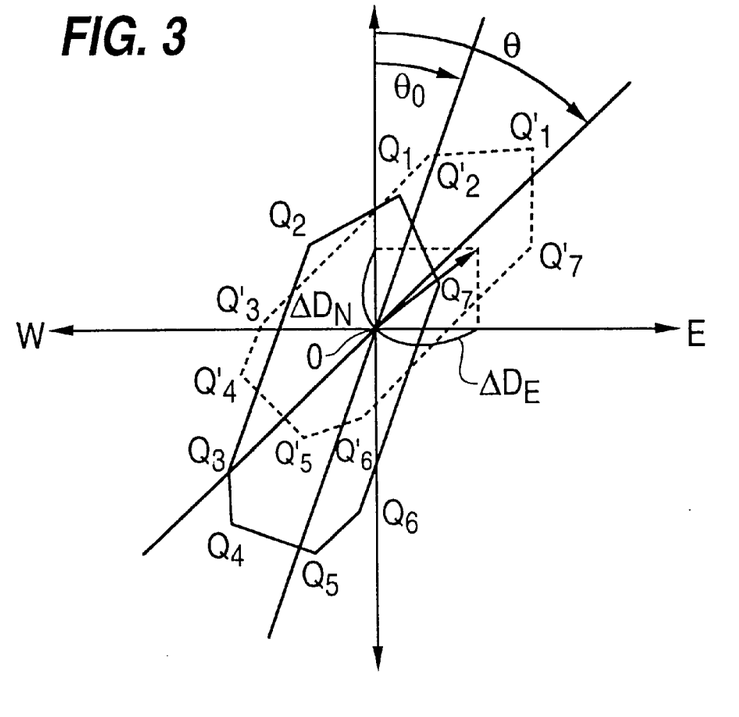
FIG. 3 is a diagram for explaining a coordinates calculation performed when the ship moves.

As shown in FIG. 3, it is assumed that the heading of the ship at a time instant t0 is θ0, and the X-axis and Y-axis of Cartesian coordinates coincide with an east-and-west direction and a north-and-south direction respectively. Coordinates Q1 through Q7 corresponding to the hull-points P1 through P7 are obtained by rotating the coordinates of the points P1 through P7 in FIG. 2 respectively about the origin "0" by an angle corresponding to the ship's heading θ0.

Next, assuming that, at another time instant t0+Δt, ship speed components in an east and a north directions at a heading "θ" are VE and VN respectively, respective coordinates Q1' through Q7' corresponding to the hull-points P1 through P7 can be obtained by rotating the coordinates Q1 to Q7 at the time t0 by (θ−θ0) respectively and then moving, in parallel with the axes, these coordinates in the east and north directions by ΔDE (=VE×Δt) and ΔDN (=VN×Δt), respectively.

In this way, the coordinates Q and Q' are obtained and then differences between Q and Q' are obtained so that distances travelled by respective points of the ship are determined. By repeating this operation, past total distances travelled by and coordinates of the points are calculated so that a past track of the ship is determined.

Figure 4:
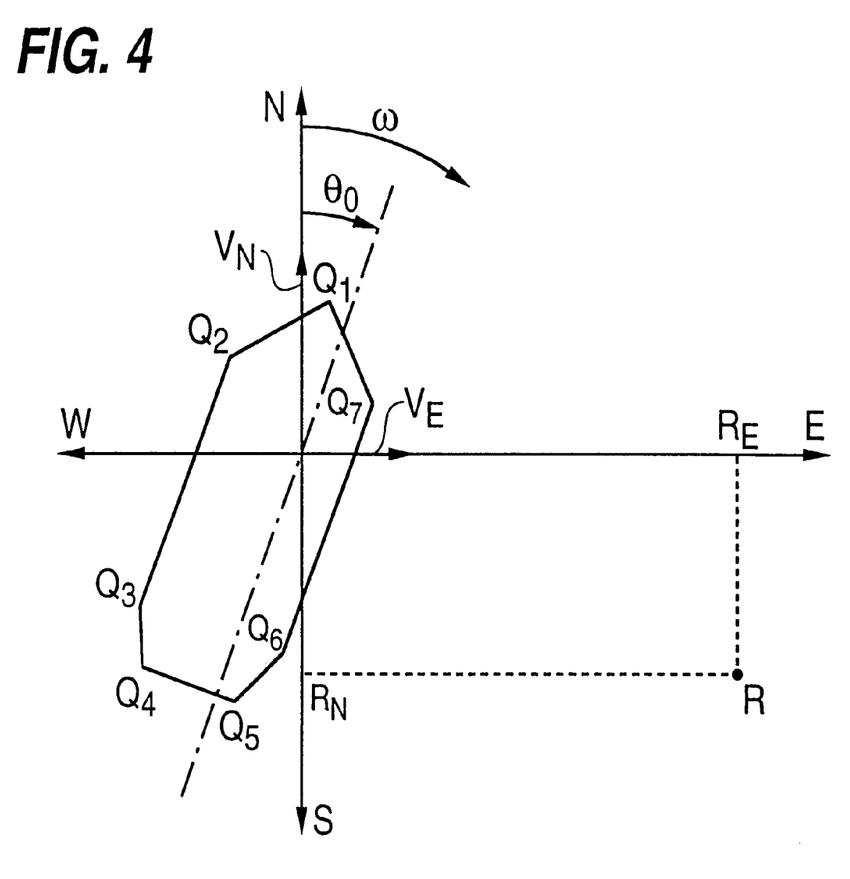
FIG. 4 is a diagram for explaining a coordinates calculation performed when the ship moves.

Next, there will be explained future predicted positions of points of the ship (ship's track). As shown in FIG. 4, it is assumed that, at a time instant t0, a ship's heading is θ0, the coordinates of points of the ship's hull are Q1 through Q7, ship speed components are VE and VN, and the rate of turn of the ship is ω. Then, the coordinates of the rotational center R of the hull can be obtained in accordance with the following equation:

$$R(E,N)=(VN/\omega,-VE/\omega)$$

Accordingly, the coordinates Q1' through Q7' of the respective points of the hull at another time instant t0+ΔT after a time ΔT elapses can be obtained by rotating the coordinates Q1 through Q7 about the rotational center R by an angle of ω×ΔT in the coordinates system.

The above description has been made on a case where the ship is turning (ω≠0). In the case of parallel movement (ω=0), predicted coordinates Q1' through Q7' of the points of the ship can be determined by adding VE×ΔT and VN×ΔT to each of the coordinates Q1 through Q7 and moving the respective points by these distances calculated.

BRIEF DESCRIPTION OF THE DRAWINGS

Throughout the drawings, it is to be noted that components having like numerals or symbols perform like functions.

DETAILED DESCRIPTION OF THE PREFERRED EMBODIMENTS

Figure 1:
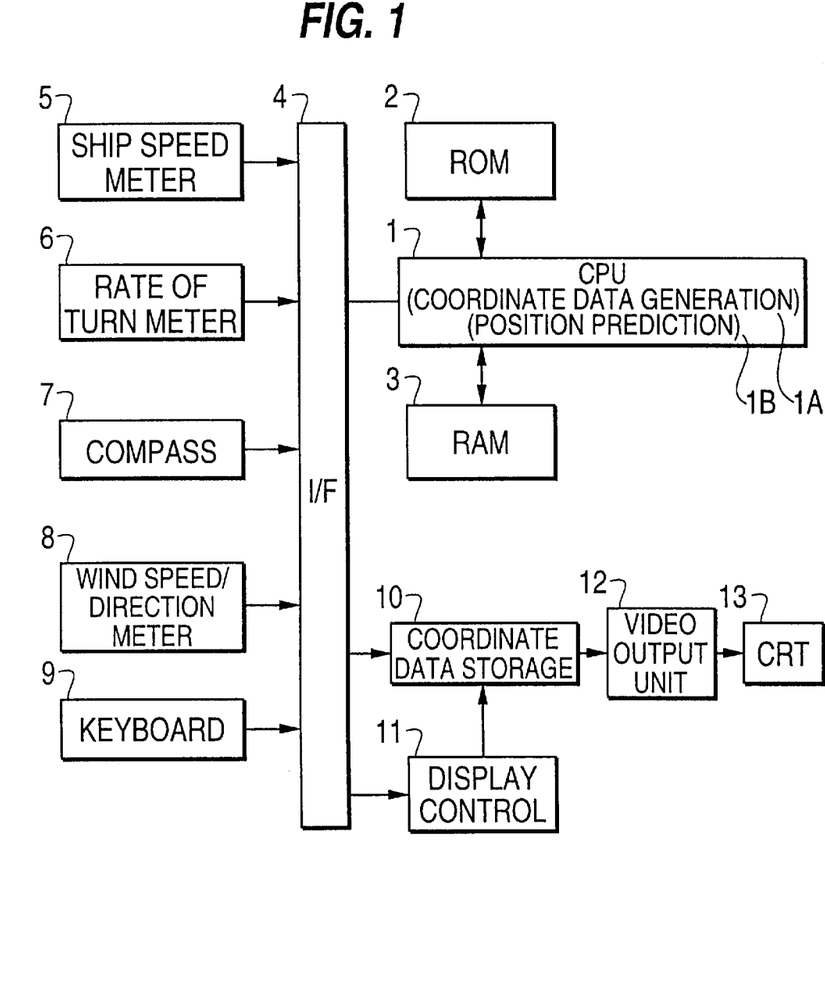
FIG. 1 is a block diagram of an embodiment of a ship maneuvering assistance system according to the present invention.

FIG. 1 is a control block diagram of an embodiment of the navigation support system according to the present invention.

A CPU (central processing unit) 1, which controls the whole of the system, comprises an HD68HC000PS made by Hitachi, Ltd. A ROM (read only memory) 2 comprises an M5M27C402K made by Mitsubishi Electric Corp., and stores programs to be executed by the CPU 1. A RAM (random access memory) 3 comprises an HM66205L made by Hitachi, Ltd. The CPU 1 writes into the RAM 3, data of ship position, heading of the ship, and the like detected by devices and units, which will be explained hereinafter, at a time period, for example every two seconds. The RAM 3 successively stores these data.

Further, the CPU 1 generates coordinates data representing a desired pattern of a ship's hull based on a hull position and a ship's heading read from the RAM 3 in order to display the hull with the pattern. The CPU 1 also computes a predicted position of the hull after a time, based on the present ship speed, heading and the present position of the own ship.

Numeral 4 denotes an interface. The following devices and units are connected to the CPU 1 through the interface 4. Numeral 5 denotes a ship speed meter for detecting the ship's speed relative to the ground or water, which comprises a transducer unit DS-330, a transmitting and receiving unit DS-320, and a computation control unit DS-310 of an ultrasonic Doppler sonar DS-30 made by FURUNO ELECTRIC CO., LTD. Numeral 6 denotes a rate of turn indicator for detecting the turning speed of the hull, which comprises a laser gyro DS-340 made by FURUNO. Numeral 7 denotes a compass for detecting heading of the ship, which comprises a gyro compass GY-700 made by FURUNO. Numeral 8 denotes a wind speed/direction meter, which comprises an FW-200 made by FURUNO. Designated by numeral 9 is a keyboard for entering various set data such as hull size and the like. A coordinate data storage unit 10, comprises an MB814400 made by FUJITSU LTD., and stores coordinate data of the pattern produced by the CPU 1. Numeral 11 denotes a display control for reading data necessary for display out of the coordinate data storage unit, and 12 denotes a video output unit for converting the coordinate data read from the coordinate data storage unit 10 into video signals appropriate for displays by a CRT display 13.

First, there will be explained operations for displaying a past track of the own ship, the present position thereof and a future predicted track of the ship with shapes of the ship's hull.

Figure 5:
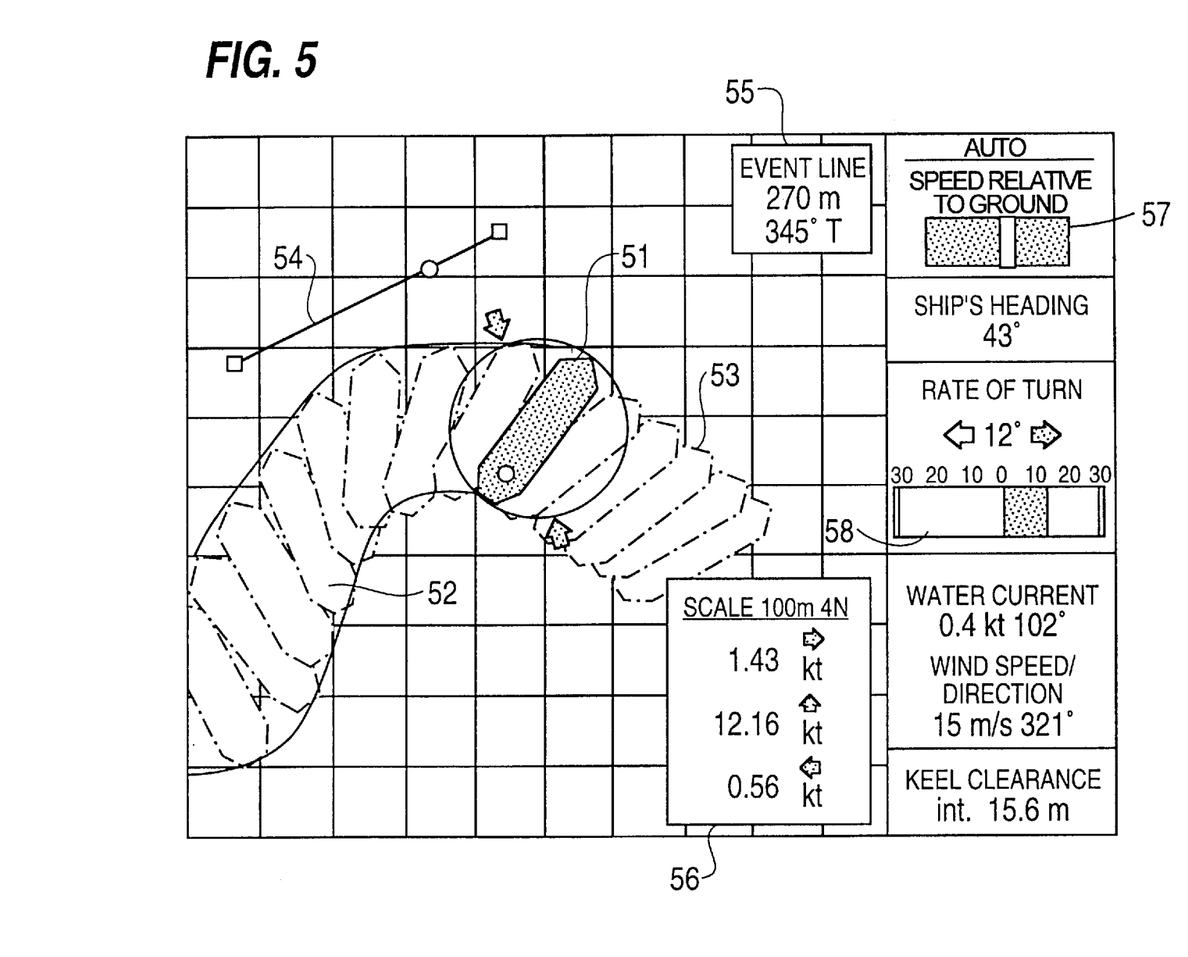
FIG. 5 is a display example presented by the system shown in FIG. 1.

In this case, tracks of the own ship are displayed as shown in FIG. 5. This figure shows a display example in which the north is directed upward on the screen, and background images are fixed. A black-colored part 51 represents the present position of the hull, broken-lined parts 52 on the left side of the present position of the ship represent the hull positions established at a time interval in the past, and broken-lined parts 53 on the right side of the present position of the ship represent predicted future hull positions. Numeral 54 denotes a pier set and entered by the keyboard 9 as an event line.

In a frame 55 on an upper right portion of the screen, there are shown the distance from the bridge position (marked by a circle) of the ship to the closest point of the maker line 54 (marked by a circle) and its bearing therebetween. Also, in a frame 56 on a lower right portion of the screen, the same data as in FIG. 10 are displayed.

Further, "GROUND SPEED" at a right end of the screen, indicates that the ship's speed with respect to the ground is being detected, and "AUTO" indicates a mode in which ground-speed signals are used when the ship's speed with respect to the ground can be detected, and water speed signals are automatically used when the ship's speed with respect to the ground can no longer be detected due to occurrences of foams or the like. A bar graph designated by numeral 57 is such that detected echoes have been blacked starting with the right side, the remaining blank part showing that an omission has taken place in the echo reception. Also, a bar graph designated by numeral 58 shows the present rate of turn and its direction.

Figure 6:
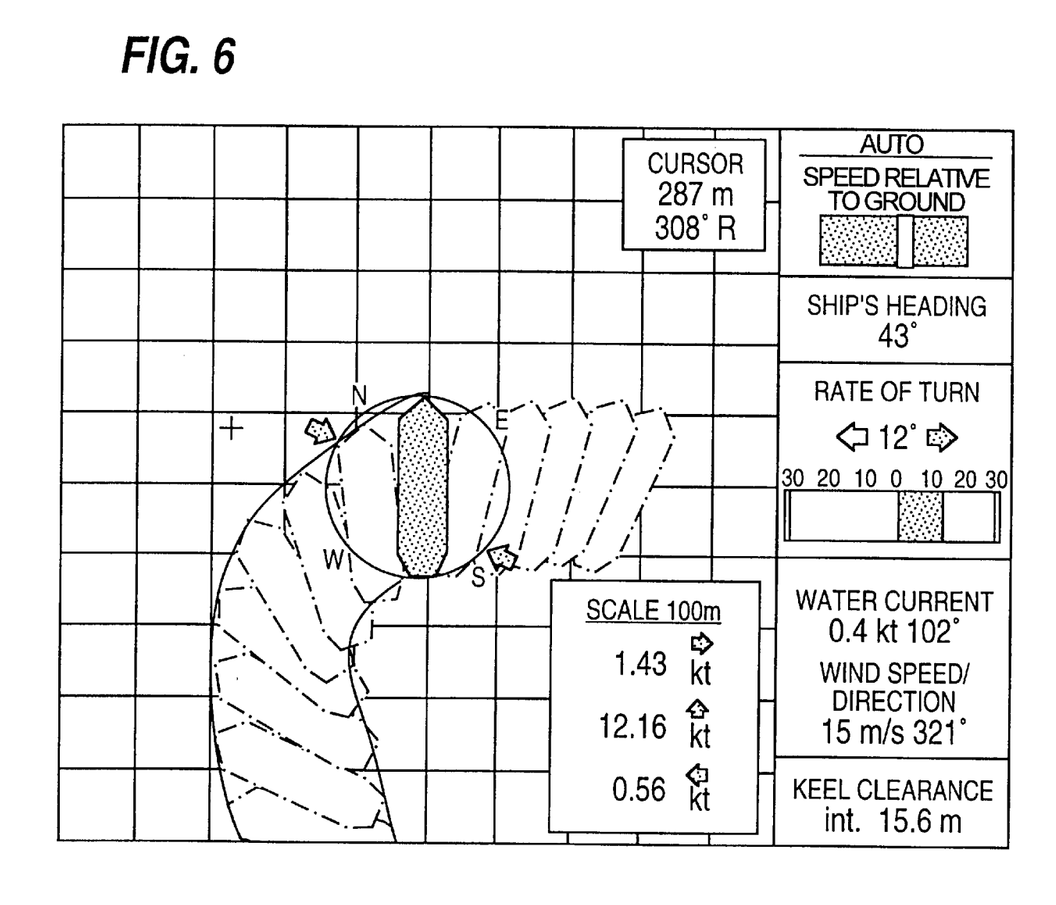
FIG. 6 is a display example presented by the system shown in FIG. 1.

FIG. 6 shows a display example in which the ship's heading is directed upward on the screen, and the own ship is fixedly displayed. In the figure, mark "+" denotes a cursor.

There have been in advance entered by the keyboard 9, data for displaying the size of the hull and the maker line 54, and coordinates of points of the ship's hull P1 through P7 with with respect to the origin 0 at which a ship speed meter is installed, which have been transmitted to the RAM 3 and stored therein.

Hereinafter, the operation of the embodiment according to the present invention as shown in FIG. 1 will be explained with reference to the flowchart shown in FIG. 11.

At step n1, the CPU 1 extracts ship's ground speed (ship's speed relative to the ground) detected by the speed meter 5 at a period, for example every two seconds, and transmits a signal representing a ship's ground speed via the interface 4 to the RAM 3 to be stored therein. Similarly, rate of turn and heading of the hull detected by the rate of turn indicator 6 and the compass 7 are transmitted at a period via the interface 4 to the RAM 3 to be stored therein.

At step n2, the CPU 1 calculates the distance travelled by a point at which the transmitting and receiving transducer unit of a sensor for detecting the ship's speed, i.e., an ultrasonic Doppler sonar is installed, based on the present ship speed, heading of the ship and a time required for the movement read from the RAM 3. The calculated distance travelled is written into the RAM 3.

At step n3, the CPU 1 calculates the distances over which points P1 through P7 of the hull of the own ship have moved from the preceding time instant to the present time instant. The calculated distances are written into the RAM 3.

At step n4, it is determined whether the rate of turn is zero or not.

If the rate of turn is zero, a calculation of V×Δt is performed at step n5 based on the present ship speed V to thereby obtain a predicted distance to be moved. Thus, new coordinates Q1 through Q7 of the respective points on the hull P1 through P7 are obtained. For example, new coordinates Q1 through Q7 of the points on the hull at five predicted positions in steps of one minute are calculated, such as new coordinates Q1' through Q7' of the hull points at a predicted position one minute after the present time instant, another new set of coordinates Q1' through Q7' of the hull points at another predicted position two minutes after the present time instant, and so on.

At step n8, signals representing the past navigation track, a present ship position and a future predicted track of the own ship in shapes of the hull of the ship are written into memory elements of the coordinate data storage unit 10 having addresses determined by a display scale and with respect to a reference point in the storage unit 10 respectively.

While, if the rate of turn is not zero at step n4, the rotational center of the hull is calculated at step n6.

At step n7, new coordinates Q1' through Q7' of the hull-points are obtained by rotating the coordinates of the hull-points P1 through P7 of the present own ship by an angle of ω×ΔT. For example, new coordinates Q1' through Q7' of the points of the hull at five predicted positions at a time interval of one minute are calculated in such a way that a new set of coordinates Q1' through Q7' of the hull points at a predicted position one minute after the present time instant, another new set of coordinates Q1' through Q7' of the hull points at a predicted position two minutes after the present time instant, and so on.

At step n8, signals representing the past navigation track, a present ship position and a future predicted track of the own ship in shapes of the hull of the ship are written into memory elements of the coordinate data storage unit 10 having addresses determined by a display scale and with respect to a reference point in the storage unit 10 respectively.

The signals read from the coordinate data storage unit 10 are converted into, for example, corresponding color signals in the video output unit 12 and then fed to the CRT indicator 13 to be displayed. As a result, as shown in FIG. 5, it is displayed in such a manner that background images are fixed and the present position of the own ship moves.

Also, at step n8, if signals representing the past navigation track, a present ship position and a future predicted track of the own ship in shapes of the hull of the ship are written into memory elements of the coordinate data storage unit 10 in accordance with a display and as the present position of the ship is at the center of the the storage unit 10, it is displayed in a manner as shown in FIG. 6 that the tracks of the ship are displayed as the present position of the own ship is kept fixed at the center of the screen.

It is to be noted that with the foregoing embodiment, the past navigation track, the present ship position and future predicted track of the own ship have been displayed in shapes of the hull. While, if the present ship position and a future predicted track of the ship are displayed in shapes of a hull, at step n8 in the flowchart of FIG. 11, signals representing the present ship position and future predicted track of the ship with shapes of the hull are written into the coordinate data storage unit 10.

Figure 11:
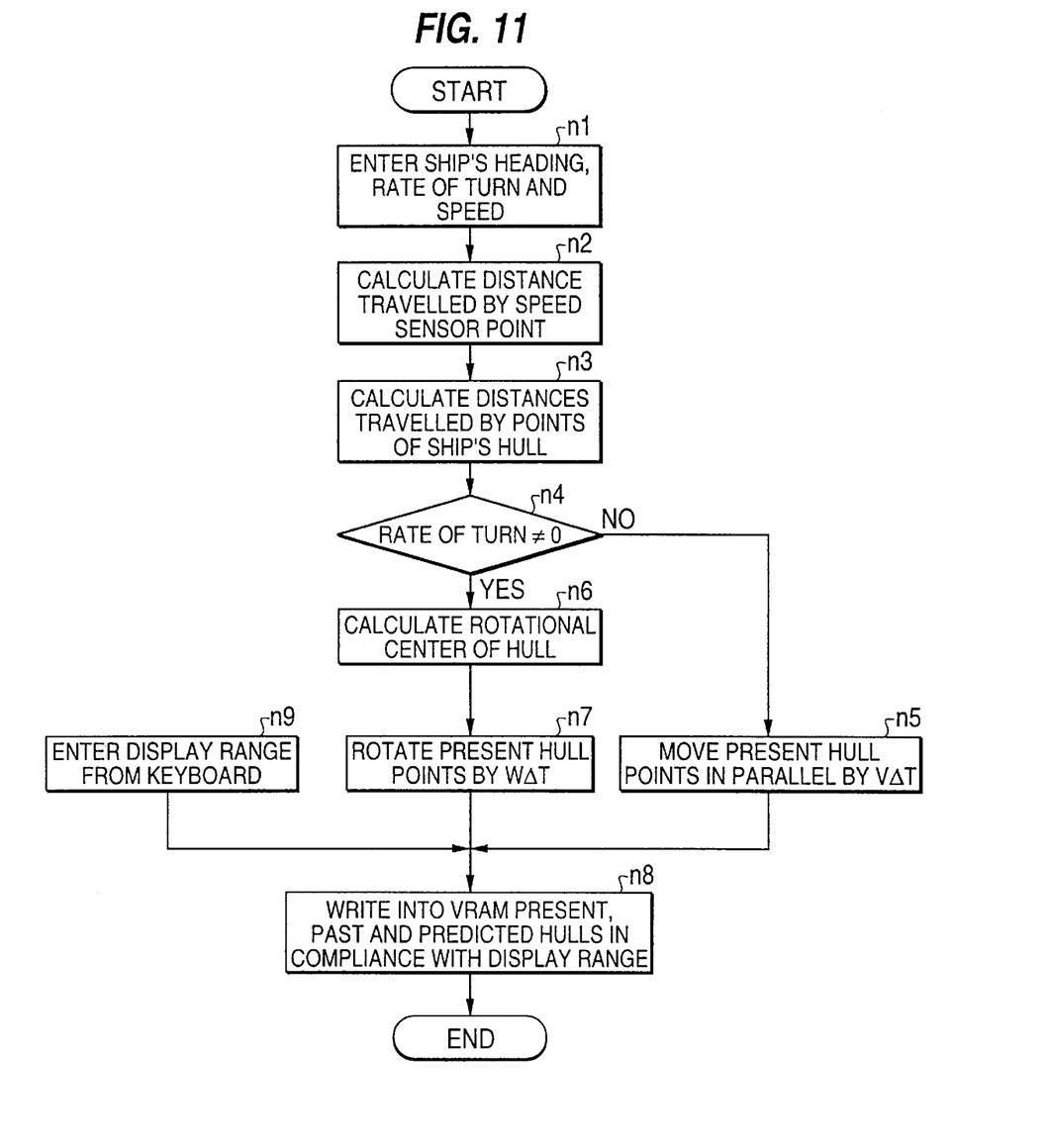
FIG. 11 is a flow chart showing operations performed by the embodiment according to the present invention shown in FIG. 1.

If a past navigation track and present ship position of the own ship are displayed in groups of shapes of the hull, steps n4 through n7 in the flowchart as shown in FIG. 11 are omitted. In this case, at step n8, signals representing the past navigation track and present ship position of the own ship with shapes of the ship's hull are written into the coordinate data storage unit 10.

Figure 7:
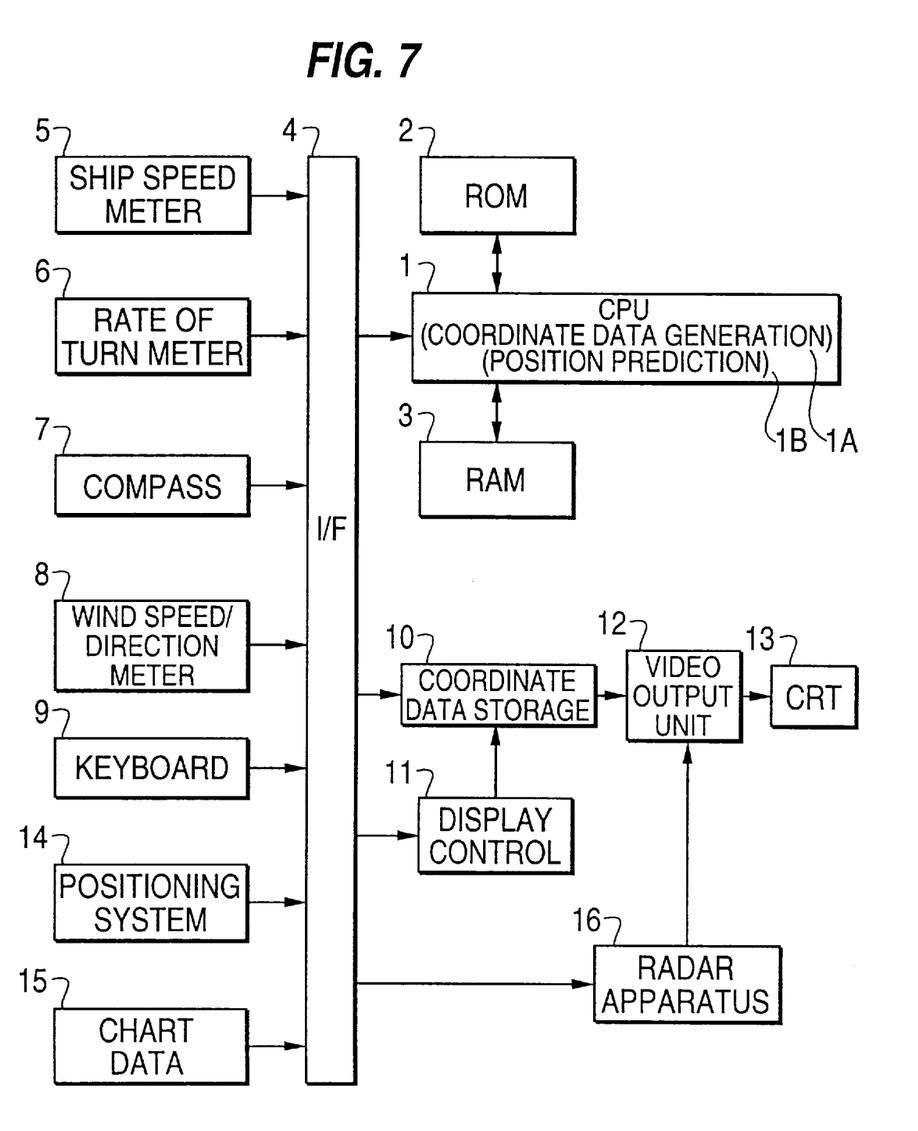
FIG. 7 is a block diagram of another embodiment of the invention in accordance with the present invention.

FIG. 7 is a block diagram of another embodiment according to the present invention.

In FIG. 7, in addition to the devices and units as shown in FIG. 1, there are provided a positioning system 14 for detecting the position of the own ship, a chart data storage unit 15 for storing topographical data such as coastlines, and a radar apparatus 16 for searching surrounding conditions, other ships, and the like around the own ship by radio waves. The positioning system 14 comprises a GPS receiver (Global Positioning System receiver) GP-500 made by FURUNO and produces signals representing the position of the own ship in latitude and longitude. The chart data storage unit 15 comprises an HM66205L made by Hitachi, Ltd. The radar apparatus 16 comprises a radar apparatus FR-1510D made by FURUNO. Display examples presented by this apparatus are given in FIGS. 8 and 9.

It is to be noted that a CPU (central processing unit) 101 comprises an HD68HC000PS made by Hitachi, Ltd., and it controls the whole of the present system.

Hereinafter, there will be explained a case in which the present position of the ship, a past navigation track and a future predicted track of the own ship are displayed with groups of shapes of the ship's hull respectively as superimposed on the earth surface at the same scale, and further radar video signals are displayed as superimposed thereon at the same scale.

Figure 8:
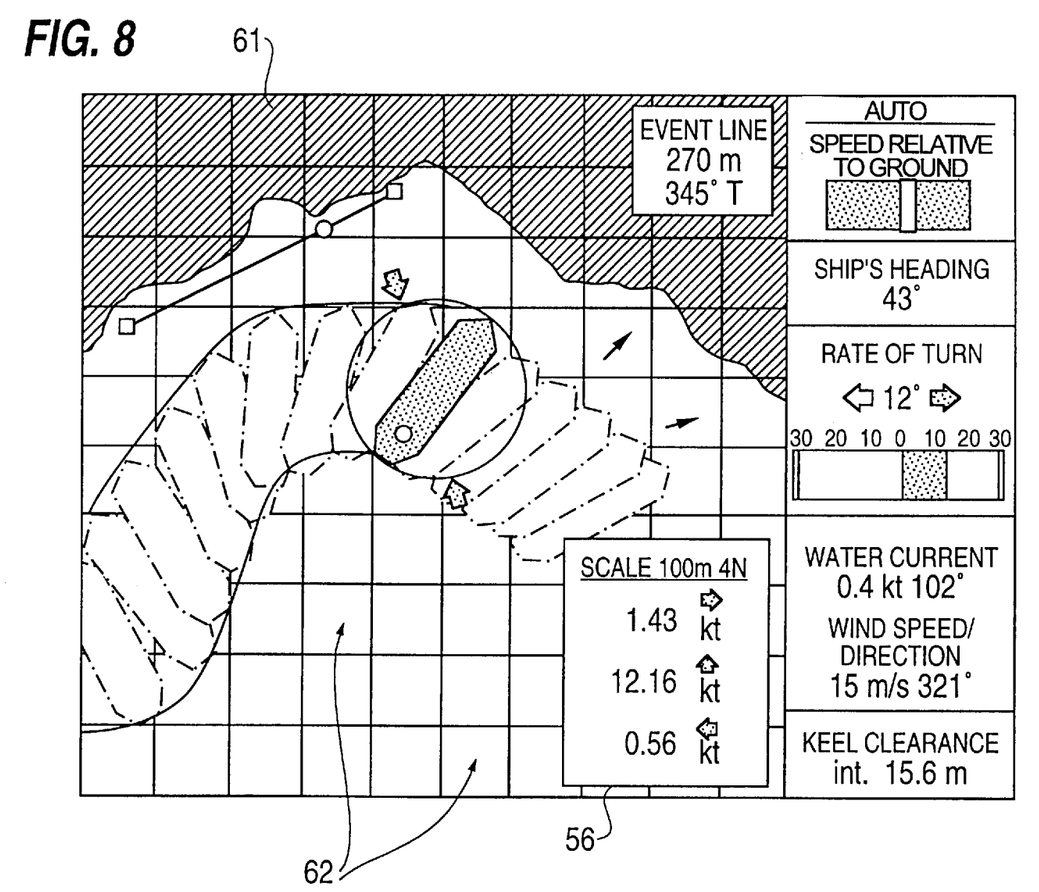
FIG. 8 is a display example presented by the system shown in FIG. 7.

FIG. 8 illustrates a display example in which the images of a lands and other ships caught by the radar apparatus 16 are displayed in addition to those of the display example shown in FIG. 5 where the north is in an upward direction. Hatched part 61 and small dots 62 represent images of a land and other ships, respectively, caught by the radar apparatus 16. In this case, the search range of the radar apparatus 16 is set so that the original display and the radar images coincide with each other in terms of display scale, and further the display mode of the radar apparatus 16 is set to a "true motion mode (the own ship moves over the screen with background images such as lands and the like are fixed)".

It is to be noted that radar video may also be displayed as superimposed on the display as shown in FIG. 6, where the ship's heading is in an upward direction.

Figure 9:
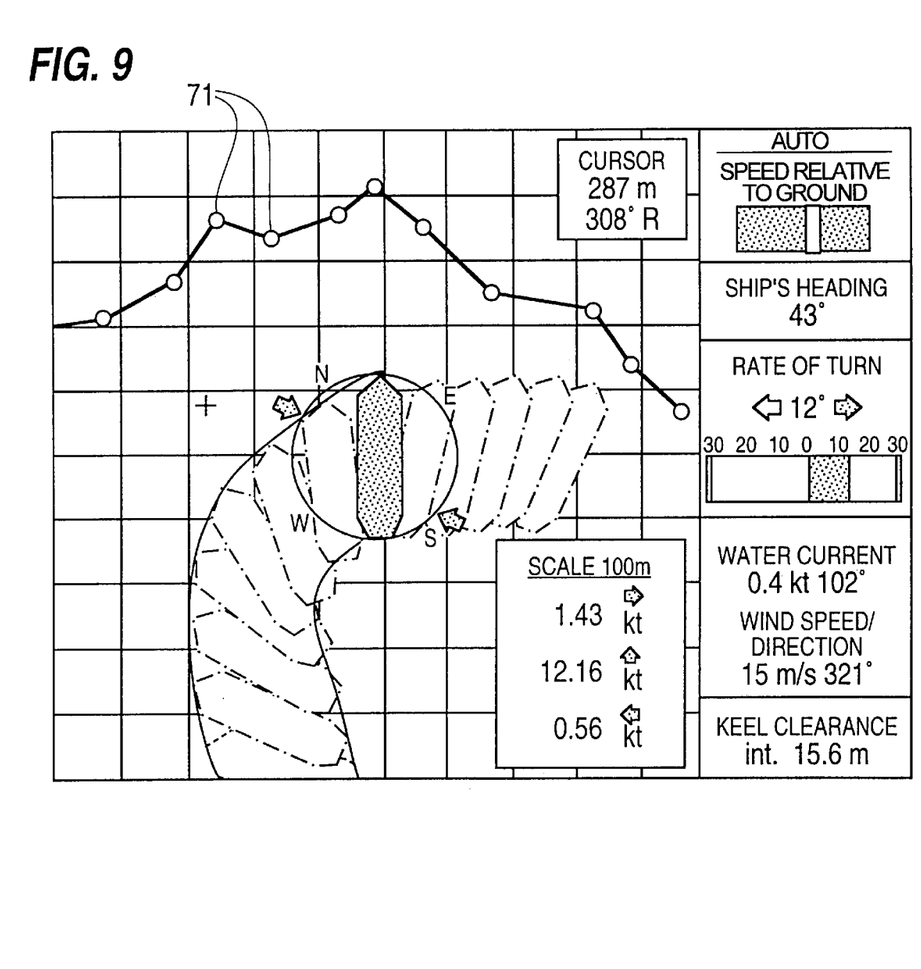
FIG. 9 is a display example presented by the system shown in FIG. 7.

FIG. 9 illustrates an example in which topographical data read from the chart data storage 15 unit are displayed, where respective blank circles 71 represent the topographical points read from the chart data storage unit 15. It is to be noted that although radar images and topographical data produced by the chart data storage unit 15 are displayed in the foregoing, both of them can also be displayed together in one display as superimposed one on another.

The operation of the embodiment according to the present invention shown in FIG. 7 will be explained with reference to the flowchart shown in FIG. 12.

At step n1, the CPU 101 extracts ship's ground speed (ship's speed relative to the ground) detected by the speed meter 5 at a period, for example every two seconds, and transmits a signal representing a ship's ground speed via the interface 4 to the RAM 3 to be stored therein. Similarly, rate of turn and heading of the hull detected by the rate of turn indicator 6 and the compass 7 are transmitted at a period via the interface 4 to the RAM 3 to be stored therein.

At step n2, the CPU 101 calculates the distance travelled by a point at which the transmitting and receiving transducer unit of a sensor for detecting the ship's speed, i.e., an ultrasonic Doppler sonar is installed, based on the present ship, speed, heading of the ship and a time required for the movement read from the RAM 3. The calculated distance travelled is written into the RAM 3.

At step n3, the CPU 101 calculates the distances over which points P1 through P7 of the hull of the own ship have moved from the preceding time instant to the present time instant. The calculated distances are written into the RAM 3.

At step n4, it is determined whether the rate of turn is zero or not.

If the rate of turn is zero, a calculation of V×Δt is performed at step n5 based on the present ship speed V to thereby obtain a predicted distance to be moved. Thus, new coordinates Q1 through Q7 of the respective points on the hull P1 through P7 are obtained. For example, new coordinates Q1 through Q7 of the points on the hull at five predicted positions in steps of one minute are calculated, such as new coordinates Q1' through Q7' of the hull points at a predicted position one minute after the present time instant, another new set of coordinates Q1' through Q7' of the hull points at another predicted position two minutes after the present time instant, and so on.

At step n8, the CPU 101 extracts own ship position information representing the position of the own ship from the positioning system 14, and writes it into the RAM 3 to be stored therein.

At step n9, a signal representing a display range is entered from the keyboard 9.

At step n10, the signal representing the display range is transmitted to the radar apparatus 16.

At step n11, there is determined an area on the earth to be displayed on the screen of the indicator 13.

At step n12, topographical data are read from the chart data storage unit 15 and entered.

At step n13, there are written into memory elements having corresponding addresses of the coordinate data storage unit 10 signals representing a past navigation track, a present position, and a future predicted track of the own ship in groups of shapes of the ship's hull and data representing land forms such as piers in compliance with the screen display area on the indicator 13. The addresses of the memory elements are determined with respect to a reference point in the coordinate data storage unit 10.

While, if the rate of turn is not zero at step n4, the rotational center of the hull is calculated at step n6.

At step n7, new coordinates Q1' through Q7' of the hull-points are obtained by rotating the coordinates of the hull-points P1 through P7 of the present own ship by an angle of ω×ΔT. For example, new coordinates Q1' through Q7' of the points of the hull at five predicted positions at a time interval of one minute are calculated in such a way that a new set of coordinates Q1' through Q7' of the hull points at a predicted position one minute after the present time instant, another new set of coordinates Q1' through Q7' of the hull points at a predicted position two minutes after the present time instant, and so on.

At step n8, the CPU 101 extracts own ship position information representing the position of the own ship from the positioning system 14, and writes it into the RAM 3 to be stored therein.

At step n9, a signal representing a display range is entered from the keyboard 9.

At step n10, the signal representing the display range is transmitted to the radar apparatus 16.

At step n11, there is determined an area on the earth to be displayed on the screen of the indicator 13.

At step n12, topographical data are read from the chart data storage unit 15 and entered.

At step n13, there are written into memory elements having corresponding addresses of the coordinate data storage unit 10 signals representing a past navigation track, a present position, and a future predicted track of the own ship in groups of shapes of the ship's hull and data representing land forms such as piers in compliance with the screen display area on the indicator 13. The addresses of the memory elements are determined with respect to a reference point in the coordinate data storage unit 10.

The signals read from the coordinate data storage unit 10 are converted into, for example, corresponding color signals in the video output unit 12 and then fed to the CRT indicator 13 to be displayed. Radar image signals in accordance with a "true motion" display mode are supplied from the radar apparatus 16 through the video output unit 12 to the indicator 13 to be displayed as superimposed on ship's tracks. As a result, it is displayed in a manner that background images are fixed and the present position of the ship moves.

Also, at step n13, there are written into the coordinate data storage unit 10, signals representing a past navigation track, a present position, and a future predicted track of the own ship in groups of shapes of the ship's hull and data representing land forms such as piers in compliance with the screen display area on the indicator 13, with the present position of the ship at its center. Radar image signals in accordance with a "course up" display mode are supplied from the radar apparatus 16 through the video output unit 12 to the indicator 13 to be displayed as superimposed on ship's tracks. As a result, it is displayed in a manner that the present position of the ship is fixed on the screen, as shown in FIG. 9.

Figure 12:
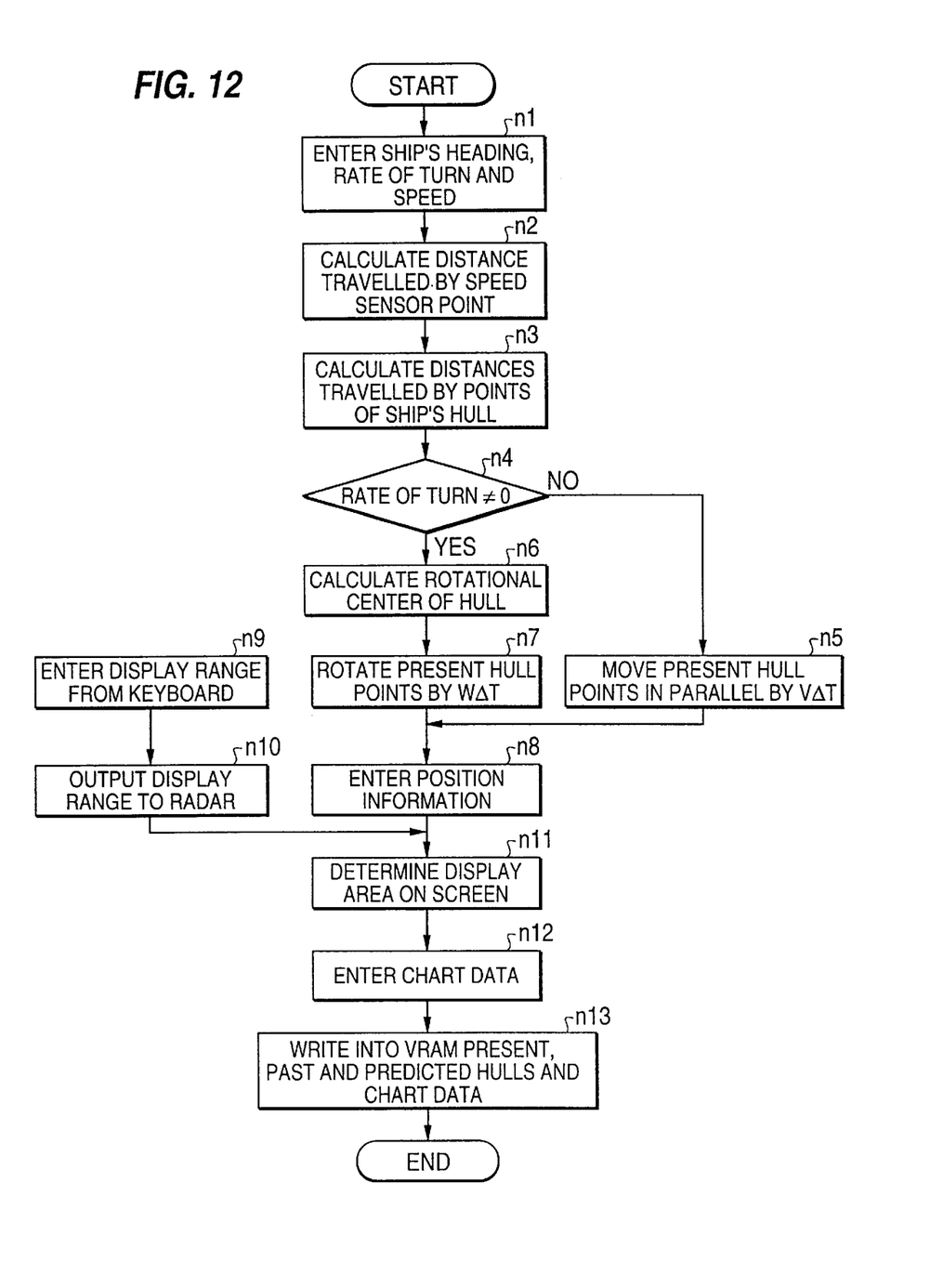
FIG. 12 is a flow chart showing operations performed by the embodiment of the present invention shown in FIG. 7.

It is to be noted that with the embodiments shown in FIGS. 7 and 12, there are displayed ship's tracks, a chart representing lands or islands and radar images as superimposed one on the other. It is also possible to display ship's tracks and a chart representing lands or islands. In this case, step n10 in the flowchart shown in FIG. 12 is omitted. Further, there can be displayed ship's tracks and radar images superimposed one on another. In this case, step n12 in the flowchart shown in FIG. 12 is omitted, and at step n13, there are written into the coordinate data storage unit 10 signals representing a past track of the own ship, the present position and a future predicted track of the ship in shapes of the ship's hull.

It is to be noted that with the embodiments shown in FIGS. 7 and 12, in addition to the arrangements that a past navigation track, a present ship position, and a future predicted track of the own ship are represented in shapes of the hull, there can also be displayed the present ship position and a future predicted track in the shapes of the hull, or a past navigation trace and a present ship position of the own ship.

Although with the foregoing embodiments, the navigation trace of the ship has been displayed in a pattern of groups of shapes of a ship, the ship may alternatively be represented in another pattern of circles or rectangles.

Although with the above embodiments the speed meter 5 comprises an ultrasonic Doppler sonar, without being limited to this apparatus, it may comprise a GPS (Global Positioning System) receiver. Besides, it is also possible to first measure the position of the own ship at two points by a navigational aid device such as a loran receiver and to calculate the distance between the two points. Then, a ship's speed can be calculated based on the calculated distance and a time required to travel the distance.

Effects Produced by the Invention

As described in the foregoing, according to the present invention, movements of a ship's hull can be grasped precisely, since the position of points of the hull is detected at a time interval and a ship's past navigation track as well as its present position are displayed on an indicator. Further, by displaying a predicted position of the ship after a specified time elapses from the present moment as well, precise or correct navigation instructions can be issued without relying on human judgements or assumptions. Moreover, surrounding conditions around the ship can be grasped more precisely and more appropriate navigation support information can be obtained, by displaying radar images and land form data as superimposed thereon.

We claim:

1. A ship maneuvering assistance system particularly useful in aiding a ship when coming alongside a pier or leaving therefrom, comprising:

a speed detector detecting speeds of the ship in two perpendicular directions;

a bearing detector detecting bearing of the ship with respect to a reference bearing;

a rate of turn measuring unit which detects a turning speed of the ship;

a memory which sequentially stores the speeds from said speed detector and the bearing of the ship output from said bearing detector;

a coordinate-data generating unit which generates coordinate data of past and future predicted tracks of the ship based on the detected ship speeds, and the detected bearing, and the turning speed output from said rate of turn measuring unit;

a coordinate data memory unit which stores the generated coordinate data; and a display unit which displays signals read from said coordinate data memory unit, the coordinate data generated by said coordinate-data generating unit enabling said display unit to display the tracks of the ship in a form of a pattern indicative of the shape of the ship.

2. A ship maneuvering assistance system particularly useful in aiding a ship when coming alongside a pier or leaving therefrom, comprising:

a speed detector detecting speeds of the ship in two perpendicular directions;

a bearing detector detecting bearing of the ship with respect to a reference bearing;

a rate of turn measuring unit which detects a turning speed of the ship;

a coordinate-data generating unit which generates coordinate data of a future predicted track of the ship based on the speeds output from said speed detector, the bearing output from said bearing detector, and the turning speed output from said rate of turn measuring unit;

a coordinate data memory unit which stores the generated coordinate data; and a display unit which displays signals read from said coordinate data memory unit, the coordinate data generated by said coordinate-data generating unit enabling said display unit to display the future track of the ship in a form of a pattern indicative of the shape of the ship.

3. A ship maneuvering assistance system, comprising:

a speed detector detecting speeds of the ship in two perpendicular directions;

a bearing detector detecting bearing of the ship with respect to a reference bearing;

a rate of turn measuring unit which detects a turning speed of the ship;

a memory which sequentially stores the speeds output from the speed detector and the bearing of the ship output from said bearing detector;

a hull point storing unit which stores signals indicative of a plurality of positions of a hull of the ship;

a coordinate-data generating unit which generates coordinate data of past and future predicted tracks of the ship based on the ship speeds and the bearing read from the memory, the turning speed output from said rate of turn measuring unit, and the signals indicative of the plurality of positions of the ship's hull read from the hull point storing unit;

a coordinate data memory unit which stores the generated coordinate data; and a display unit which displays signals read from said coordinate data memory unit, the coordinate data generated by said coordinate-data generating unit enabling said display unit to display the tracks of the ship in a form of a pattern indicative of the shape of the ship.

4. A ship maneuvering assistance system, comprising:

a speed detector detecting speeds of the ship in two perpendicular directions;

a bearing detector detecting bearing of the ship with respect to a reference bearing;

a rate of turn measuring unit which detects a turning speed of the ship;

a hull point storing unit which stores signals indicative of a plurality of positions of a hull of the ship;

a coordinate-data generating unit which generates coordinate data of a future predicted track of the ship based on the ship speeds detected by the speed detector, the bearing output from the bearing detector, the turning speed output from said rate of turn measuring unit, and the signals indicative of the plurality of positions of the ship's hull read from the hull point storing unit;

a coordinate data memory unit which stores the generated coordinate data; and a display unit which displays signals read from said coordinate data memory unit, the coordinate data generated by said coordinate-data generating unit enabling said display unit to display the future predicted track of the ship in a form of a pattern indicative of the shape of the ship.

5. A ship maneuvering assistance system, comprising:

a speed detector detecting speeds of the ship in two perpendicular directions;

a bearing detector detecting bearing of the ship with respect to a reference bearing;

a rate of turn measuring unit which detects a turning speed of the ship;

a hull point storing unit which stores signals indicative of a plurality of positions of a hull of the ship;

a coordinate-data generating unit which generates coordinate data of a past track of the ship based on the ship speeds and the bearing output from the memory, and the signals indicative of the plurality of positions of the ship's hull read from the hull point storing unit;

a coordinate data memory unit which stores the generated coordinate data; and a display unit which displays signals read from said coordinate data memory unit, the coordinate data generated by said coordinate-data generating unit enabling said display unit to display the past track of the ship in a form of a pattern indicative of the shape of the ship.

6. A ship maneuvering assistance system particularly useful in aiding a ship when coming alongside a pier or leaving therefrom, comprising:

a ship movement measuring unit which measures movements of a ship;

a coordinate-data generating unit which generates coordinate data of past and future predicted tracks of the ship with respect to the surface of the earth based on the ship's movements measured by said ship movement measuring unit;

a land form memory unit which stores signals indicative of land forms;

a display unit which displays the past and future predicted tracks of the ship and the land forms based on the data read from said coordinate data generating unit and the signals indicative of the land forms read from the land form memory, the coordinate data generated by said coordinate-data generating unit enabling said display unit to display the tracks of the ship in a form of a pattern indicative of the shape of the ship.

7. A ship maneuvering assistance system particularly useful in aiding a ship when coming alongside a pier or leaving therefrom, comprising:

a ship movement measuring unit which measures movements of a ship;

a coordinate-data generating unit which generates coordinate data of a future predicted track of the ship with respect to the surface of the earth based on the ship's movements measured by said ship movement measuring unit;

a land form memory unit which stores signals indicative of land forms;

a display unit which displays the future predicted track of the ship and the land forms based on the data read from said coordinate data generating unit and the signals indicative of the land forms read from the land form memory, the coordinate data generated by said coordinate-data generating unit enabling said display unit to display the track of the ship in a form of a pattern indicative of the shape of the ship.

8. A ship maneuvering assistance system particularly useful in aiding a ship when coming alongside a pier or leaving therefrom, comprising:

a ship movement measuring unit which measures movements of a ship;

a coordinate-data generating unit which generates coordinate data of a past track of the ship with respect to the surface of the earth based on the ship's movements measured by said ship movement measuring unit;

a land form memory unit which stores signals indicative of land forms;

a display unit which displays the past track of the ship and the land forms based on the data read from said coordinate data generating unit and the signals indicative of the land forms read from the land form memory, the coordinate data generated by said coordinate-data generating unit enabling said display unit to display the track of the ship in a form of a pattern indicative of the shape of the ship.

9. A ship maneuvering assistance system particularly useful in aiding a ship when coming alongside a pier or leaving therefrom, comprising:

a speed detecting unit detecting speeds of the ship in two perpendicular directions by a GPS receiver;

a bearing detector detecting bearing of the ship with respect to a reference bearing;

a rate of turn measuring unit which detects a turning speed of the ship;

a memory which sequentially stores the speeds from said speed detecting unit and the bearing of the ship output from said bearing detector;

a coordinate-data generating unit which generates coordinate data of past and future predicted tracks of the ship based on the detected ship speeds, and the detected bearing, and the turning speed output from said rate of turn measuring unit;

a coordinate data memory unit which stores the generated coordinate data;

a radar signal providing unit which provides radar image signals; and a display unit which displays signals read from said coordinate data memory unit and the radar image signals provided by said radar signal providing unit, the coordinate data generated by said coordinate-data generating unit enabling said display unit to display the track of the ship in a form of a pattern indicative of the shape of the ship.

10. A ship maneuvering assistance system, comprising:

a speed detector detecting a ship speed vector;

a bearing detector detecting bearing of the ship with respect to a reference bearing;

a rate of turn measuring unit which detects a turning speed of the ship;

a coordinate-data generating unit which generates coordinate data of a future predicted track of the ship based on the speed output from said speed detector, the bearing output from said bearing detector, and the turning speed output from said rate of turn measuring unit;

a coordinate data memory unit which stores the generated coordinate data;

a radar signal providing unit which provides radar image signals; and a display unit which displays signals read from said coordinate data memory unit and the radar image signals provided by said radar signal providing unit, the coordinate data generated by said coordinate-data generating unit enabling said display unit to display the track of the ship in a form of a pattern indicative of the shape of the ship.

11. A ship maneuvering assistance system, according claims 1–8 and 10, wherein said speed detector includes a doppler sonar.

12. A ship maneuvering assistance system, according to claims 1–8 and 10, wherein said speed detector includes a GPS receiver.

13. The ship maneuvering assistance system of claims 6–8 wherein said land forms include the shape of a land and the presence of islands.

14. A ship maneuvering assistance system particularly useful in aiding a ship when coming alongside a pier or leaving therefrom, comprising:

a speed detector detecting speeds of the ship in two perpendicular directions;

a bearing detector detecting bearing of the ship with respect to a reference bearing;

a rate of turn meter unit which detects a turning speed of the ship;

a ship future position signal generation circuit generating signals representative of a future predicted track of the ship based on the speeds detected by said speed detector, the bearing detected by said bearing detector and the turning speed output from said rate of turn meter; and a display, operatively connected to said ship future position signal generating circuit, and displaying the future predicted track of the ship from the future position signal.

15. The ship maneuvering assistance system of claim 14 wherein said display displays the ship track in the form of a pattern indicative of the shape of the ship from the future position signal.

16. The ship maneuvering assistance system of claim 15 wherein said ship future position signal generation circuit includes a ship hull point signal generator generating a signal representative of the points of the ship's hull displayed by said display.

* * * * *